Patented Aug. 16, 1938

2,127,096

UNITED STATES PATENT OFFICE 2,127,096

POLYCYCLIC AROMATIC ALDEHYDES AND CARBOXYLIC ACIDS AND A PROCESS OF PREPARING THEM

Heinrich Vollmann, Frankfort-on-the-Main-Hochst, and Hans Becker, Hofheim in Taunus, Germany, assignors to General Aniline Works, Inc., New York, N. Y., a corporation of Delaware No Drawing. Application February 8, 1937, Serial No. 124,774. In Germany February 11, 1936

8 Claims. (Cl. 260—523)

The present invention relates to poly-cyclic aromatic aldehydes and carboxylic acids and a process of preparing them.

We have found that well-defined decomposition products are obtainable with satisfactory yield by causing ozonized oxygen to act on aromatic compounds with four or more condensed rings and subsequently or simultaneously splitting up the ozonides formed, which need not be isolated. The course of reaction is surprising since it was to be expected that ill-definable mixtures would be obtained.

By causing, for instance, ozone to act on a fine suspension of fluoranthene (Formula I) in glacial acetic acid and working as more fully described in Example 3 of this specification there is obtained besides fluorenone-1-carboxylic acid (about 30 per cent of the theoretical) fluorenone-1-aldehyde (Formula II) with a yield of about 30 per cent.

Analogously there is obtained from benzanthrone (Formula III) besides anthraquinone-1-carboxylic acid with a yield of about 30-40 per cent the anthraquinone-alpha-aldehyde of Formula IV which otherwise is accessible only with difficulty:

tacked by chromic acid and as a result there are obtained, besides the acids which are also obtainable by oxidation with chromic acid, the corresponding aldehydes.

In other cases ozone acts quite differently on the poly-cyclic compound, for instance, when using pyrene. Whereas, as known, pyrene is decomposed by chromic acid to form the naphthalene-1,4,5,8-tetracarboxylic acid and thus the middle naphthalene-complex of the pyrene molecule is preserved, it is just this naphthalene complex which is acted upon in the reaction of ozone with pyrene and the phenanthrene or the diphenyl complex respectively, of the pyrene molecule, remains preserved. According to the duration of the action of ozone on pyrene there is obtained after finishing the process either a compound which is regarded as 4-phenanthrene-aldehyde-5-carboxylic acid (Formula V) or the diphenyl-2,2',6,6'-tetracarboxylic acid (Formula VI)

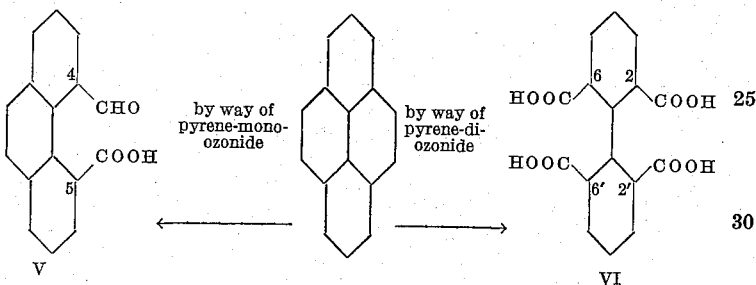

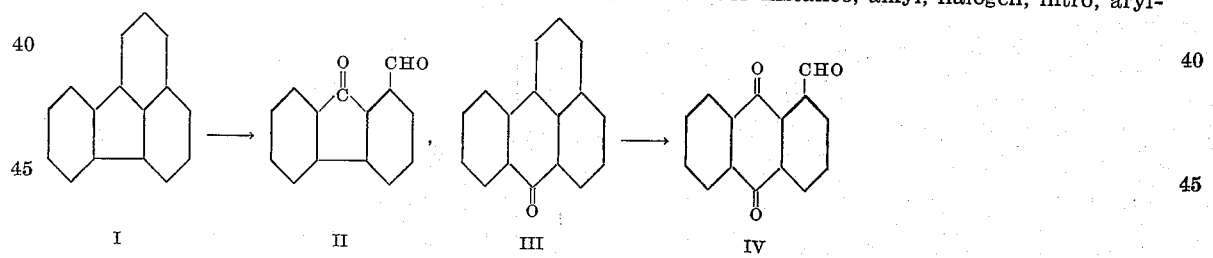

Instead of the polycyclic hydrocarbons, cyclic ketones or quinones there may also be used their substitution products. They react with ozone in an analogous manner in so far as they are stable to ozone. For instance, alkyl, halogen, nitro, aryl- In both cases the ozone acts on the parent material at those places which are known to be at- and carboxyl substitution products may be used.

The following examples serve to illustrate the invention, but they are not intended to limit it thereto; the parts are by weight:

1. A fine suspension is prepared by dissolving 200 parts of fluoranthene in 2000 parts of glacial acetic acid with the aid of heat and quickly cooling the solution. Through the finely crystalline suspension obtained, a current of finely divided ozoniferous oxygen or ozoniferous air is conducted at room temperature, for instance, through a false bottom of glass frit. The fluoranthene is thereby dissolved gradually with a production of a yellow-orange color. The duration of the ozonization depends on the amount of ozone in the gas used, on the rapidity of the current and on the distribution of the gas in the liquid. The ozonization may be regarded as finished when a test portion taken from the batch and heated to boiling yields, when diluted with water, no resinous products but crystalline precipitate. The batch is then diluted with 6000 parts of water, heated to boiling and the solution is allowed to cool. 125–130 parts of small light-brownish-yellow crystals separate. Though this crude product after repeated re-crystallizations from glacial acetic acid has a constant melting point of 181° C. and is insoluble in cold sodium carbonate solution, it is a mixture (perhaps a molecular compound) of fluorenone-1-carboxylic acid and fluorenone-1-aldehyde. In order to separate the crude product into its components it is dissolved in 550 parts of concentrated bisulfite solution at boiling temperature. The solution is diluted with ice and water to about 2500 parts, filtered and the clear cold filtrate is acidified with dilute hydrochloric acid. Thereby 55 parts of practically pure fluorenone-1-carboxylic acid are precipitated in the form of microscopic ochre-colored crystals. It recrystallizes from glacial acetic acid in the form of orange needles melting at 197° C. and dissolves to a clear solution in dilute cold sodium carbonate or ammonia solution.

The clear cold bisulfite-filtrate, which remains clear when acidified more strongly in the cold, is gradually heated to boiling. Thereby small lemon-yellow needles separate in the form of a thick magna which is filtered with suction after some time, washed and dried. The yield is 45 parts of practically pure fluorenone-1-aldehyde. It crystallizes from glacial acetic acid in long light-yellow brilliant prisms melting at 193–194° C.

2. By treating with ozone as indicated in the foregoing example a suspension of 100 parts of benzanthrone in 1000 parts of glacial acetic acid, the parent material gradually dissolves. Before all the benzanthrone has been attacked i. e. when a test portion taken from the mixture and dissolved in concentrated sulfuric acid still shows an orange fluorescence, the product is precipitated by addition of water and filtered with suction. By boiling the solid matter for a short time in a solution of sodium carbonate of 3 per cent strength the anthraquinone-1-carboxylic acid present is dissolved. The residue consists of a mixture of unchanged benzanthrone and anthraquinone-1-aldehyde which may easily be separated into its components by treating the mixture with a warm alkaline hydrosulfite solution, whereby anthraquinone-1-aldehyde is dissolved and benzanthrone remains undissolved. From the filtered red-brown vat, not heated above 80° C., the anthraquinone-1-aldehyde is separated by stirring in air, in the form of nearly colorless microscopic needles. The yield amounts to about 30–40 parts. The anthraquinone-1-aldehyde has the known properties and, what is not yet known, in the colorless bisulfite-solution of the aldehyde dyes wool surprisingly intense carmine-red shades whereas the bath remains colorless. By heating the aldehyde in water with a little bisulfite and amino-acetic acid a deep red solution is obtained.

By introducing ozone in excess into the suspension of benzanthrone in glacial acetic acid, complete decolorization finally occurs and the practically pure anthraquinone-1-carboxylic acid separates with a good yield.

3. A suspension is prepared by dissolving 100 parts of pyrene in 1000 parts of hot glacial acetic acid and subsequent rapid cooling. Into this suspension a finely divided stream of oxygen containing about 2–8 per cent by volume of ozone is introduced at about 20° C. The pyrene dissolves gradually. When the reaction has gone so far that a brown, only slightly turbid solution is formed this solution is poured into 3000 parts of water and the reaction product is thus precipitated in the form of light-grey to brown flakes. The whole is then heated until the precipitated product begins to bake together and filtered through a cloth filter. The residue is then boiled twice for some minutes, each time with 1500 parts of caustic soda solution of 3 per cent strength. The residue, which remains after the second extraction and which, when appropriately dosing the ozone, is only small, consists principally of unaltered pyrene.

The brown alkaline filtrates are combined and 350 parts of hypochlorite solution (containing about 14 per cent of active chlorine) are added at water-bath temperature, the brown color of the solution fading to faintly reddish-yellow. The solution is once more purified by filtration. After addition of 600 parts of caustic soda solution of about 40 per cent strength, colorless brilliant leaflets of a sodium salt begin to precipitate even while the mixture is hot. After cooling over night the sodium salt which has separated is filtered with suction, washed once with a saturated solution of sodium chloride and then stirred with dilute hydrochloric acid. The whole is warmed and the free carboxylic acid is filtered with suction while warm, washed well with water and dried. The yield amounts, when appropriately dosing the ozone, to 40–45 parts of practically pure product.

The carboxylic acid thus obtained, which according to a series of analyses has the composition $C_{16}H_{10}O_3$, crystallizes from trichlorobenzene or glacial acetic acid in colorless, fine needles melting at 272° C. Since a large quantity of phenanthrene is formed (which may be identified as such or by its transformation into the quinone) by dry distillation of a mixture of the said carboxylic acid with soda lime, the product has probably the structure of a 4-phenanthrene-aldehyde-5-carboxylic acid. (Form. V) There is, however, not completely excluded a somewhat other structure, corresponding, for instance, with Formula Va or Vb

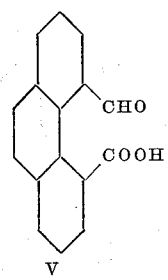 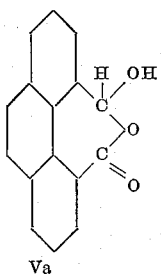 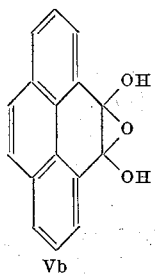

V  Va  Vb

Phenanthrene-4-aldehyde-5-carboxylic acid may be transformed into 1-hydroxy-2-phenyl-azopyrene and 1-hydroxypyrene, respectively, by heating it in glacial acetic acid with phenylhydrazine or hydrazine. Alkaline oxidation of the phenanthrene-aldehyde-carboxylic acid with a small excess of permanganate leads easily to the known diphenyl-2,2'-6,6'-tetra-carboxylic acid whereas by cautious oxidation with chromic acid in glacial acetic acid the hitherto unknown phenanthrene-q u i n o n e - 4.5-dicarboxylic acid (crystallizing from nitrobenzene in the form of yellow needles melting at 298° C. with decomposition) is obtained.

By causing ozone to act upon the suspension of pyrene for a longer period of time than above indicated, the brown solution becomes again of light color. In the further course of the process the diphenyl-2,2',6,6'-tetra-carboxylic acid is directly obtained for the greater part, phenanthrene-aldehyde-carboxylic acid not being formed.

Instead of pyrene certain pyrene derivatives may be caused to react analogously with ozone. Solvents other than glacial acetic acid may also be used in so far as they are practically stable to ozone, for instance, carbon tetrachlorine or nitrobenzene. In this case the ozonides obtained or their cleavage products, respectively, are worked up in the same way as described in the above examples after removal of the solvent by means of steam.

We claim:

1. The process which comprises causing ozonized oxygen to act at about room temperature on an aromatic compound containing at least four condensed nuclei in the presence of a liquid inert diluent and decomposing the ozonide thus obtained.

2. The process which comprises causing ozonized oxygen to act at about room temperature on fluoranthene in the presence of glacial acetic acid and decomposing the ozonide thus obtained.

3. The process which comprises causing ozonized oxygen to act at about room temperature on fluoranthene in the presence of glacial acetic acid until a test portion of the solution obtained when boiled and diluted with water yields no resinous but a solid crystalline body and decomposing the ozonide thus obtained.

4. The process which comprises causing ozonized oxygen to act at about room temperature on benzanthrone in the presence of glacial acetic acid and decomposing the ozonide thus obtained.

5. The process which comprises causing ozonized oxygen to act at about room temeperature on benzanthrone in the presence of glacial acetic acid until a test portion of the solution obtained when dissolved in concentrated sulfuric acid still shows an orange fluorescence and decomposing the ozonide thus obtained.

6. The process which comprises causing ozonized oxygen to act at about room temperature on pyrene in the presence of glacial acetic acid and decomposing the ozonide thus obtained.

7. The process which comprises causing ozonized oxygen to act at about room temperature on pyrene in the presence of glacial acetic acid until a brown scarcely turbid solution is obtained and decomposing the ozonide thus obtained.

8. The compound of the formula:

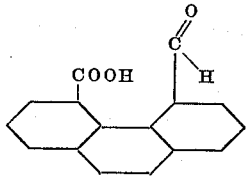

crystallizing from trichlorobenzene in the form of colorless needles melting at 272° C.

HEINRICH VOLLMANN.
HANS BECKER.